(12) United States Patent
Bagby et al.

(10) Patent No.: US 7,396,442 B2
(45) Date of Patent: Jul. 8, 2008

(54) ELECTROCHEMICAL OXYGEN GENERATOR MODULE ASSEMBLY

(75) Inventors: Brad M. Bagby, Geneseo, IL (US); Scott H. Harvey, West Liberty, IA (US)

(73) Assignee: Carleton Life Support Systems, Inc., Orchard Park, NY (US)

( * ) Notice: Subject to any disclaimer, the term of this patent is extended or adjusted under 35 U.S.C. 154(b) by 286 days.

(21) Appl. No.: 11/307,290

(22) Filed: Jan. 31, 2006

(65) Prior Publication Data

US 2006/0175194 A1  Aug. 10, 2006

Related U.S. Application Data

(60) Provisional application No. 60/593,713, filed on Feb. 8, 2005.

(51) Int. Cl.
*C25B 9/02* (2006.01)

(52) U.S. Cl. .................. 204/288; 204/263; 204/265; 204/266; 204/275; 204/277; 204/278; 204/279; 204/280; 204/281; 204/286.1; 204/289; 204/421; 429/27; 429/30; 429/31; 429/32; 429/34; 429/38; 429/39; 429/40; 422/120; 422/122

(58) Field of Classification Search .................. 204/275, 204/277, 278, 279, 280, 281, 286, 288, 289, 204/263, 265, 266, 421; 429/27, 30, 31, 429/32, 34, 38, 39, 40; 422/120, 122
See application file for complete search history.

(56) References Cited

U.S. PATENT DOCUMENTS

| | | | |
|---|---|---|---|
| 5,397,443 A | 3/1995 | Michaels | |
| 5,480,738 A | 1/1996 | Elangovan et al. | |
| 5,871,624 A | 2/1999 | Crome | 204/286.1 |
| 5,985,113 A * | 11/1999 | Crome et al. | 205/343 |
| 6,352,624 B1 * | 3/2002 | Crome et al. | 204/277 |
| 6,685,235 B1 | 2/2004 | Hart | 285/318 |

FOREIGN PATENT DOCUMENTS

EP    0433259 A1    12/1990

* cited by examiner

*Primary Examiner*—Bruce F Bell
(74) *Attorney, Agent, or Firm*—Marsteller & Associates, P.C.

(57) ABSTRACT

An ionically conductive ceramic element includes a central unit (703). The central unit (703) is composed of a plurality of integrated manifold and tube modules (IMAT) (22) joined end to end along a central axis (A). Each IMAT module (22) has a tube support portion (804) and a plurality of tubes (802) extending from the first surface (803). The tubes (802) each have a closed end (805) and an open end. The second surface (807) is at least partially open to the atmosphere. The open ends of the tubes (802) are open to the atmosphere through the second surface (807). An interior space (830) is formed in the interior of the IMAT (22) for collecting a desired product gas. A collection tube (710) is operable joined with a first end (714) of the central unit (703) for transporting the desired product gas collected in the interior space (730) of the connected IMAT modules (22).

11 Claims, 9 Drawing Sheets

ELECTROCHEMICAL OXYGEN GENERATOR MODULE ASSEMBLY

CROSS REFERENCE TO RELATED APPLICATIONS

This application claims the benefit of U.S. Provisional Application Ser. No. 60/593,713, filed Feb. 8, 2005, entitled ELECTROCHEMICAL OXYGEN GENERATOR MODULE ASSEMBLY.

BACKGROUND OF THE INVENTION

1. Technical Field

The invention relates to the field of devices for separating oxygen from a more complex gas containing oxygen to deliver separated oxygen for use. More particularly, the invention relates to solid state electrochemical devices for separating oxygen from a more complex gas.

2. Background Art

It is well known, and has been demonstrated, that oxygen can be removed from more complex gasses, such as air, by an electrochemical process of ionizing the oxygen molecules, transporting the oxygen ions through a solid electrolyte and reforming the oxygen molecules on an opposite electrolyte surface. An electrical potential is applied to a suitable catalyzing electrode coating applied to the surface of the electrolyte which is porous to oxygen molecules and which acts to disassociate oxygen molecules into oxygen ions at its interface with the electrolyte. The oxygen ions are transported through the electrolyte to the opposite surface, which is also coated with a catalyzing electrode and electrically charged with the opposite electrical potential that removes the excess electrons from the oxygen ions, and oxygen molecules are reformed. However, current oxygen generating systems are generally unable to deliver high-pressure oxygen above 1800 psi. Thus, a need exists in the art for a system and a method which provides a high-pressure oxygen. Another need exists in the art for an oxygen generating system which can use contaminated air which is contaminated, for example, with biological agents or other toxic substances.

Integrated Manifold and Tube (IMAT) module designs are known. For example, U.S. Pat. Nos 5,871,624; 5,985,113; 6,352,624; 6,685,235; and 6,783,646 owned by the assignee teach such known IMAT designs in an oxygen generating system. However, such prior IMAT designs and mounting methods required a spherical joint between one IMAT unit and a metal tube extending out of the oven. Or other designs used for all the ovens built before the present invention required a spherical joint and outlet or delivery tube to get the oxygen out of each IMAT. Such joints are all highly susceptible to leakage, and are very expensive.

While the above cited references introduce and disclose a number of noteworthy advances and technological improvements within the art, none completely fulfills the specific objectives achieved by this invention.

SUMMARY OF THE INVENTION

In accordance with the present invention, an ionically conductive ceramic element includes a central unit having a first end and a second end. The central unit is composed of a plurality of integrated manifold and tube modules (IMAT) being joined end to end along a central axis. Each IMAT module has at least one tube support portion having first and second surfaces and a plurality of tube portions extending from the first surface. The tube portions each have a closed end and an open end. The second surface is at least partially open to the atmosphere. The open ends of the plurality of tube portions are open to the atmosphere through the second surface. An interior space is formed in the interior of the IMAT module for collecting a desired product gas. A product output or collection tube is operable joined with the first end of the central unit for transporting the desired product gas collected in the interior space of the connected IMAT modules.

A ceramic element is provided which can be injection molded from an electrolyte and a binder. The ceramic element includes a tube support portion and a plurality of tubes extending from the tube support portion. The plurality of tubes is arranged in rows and columns. A plurality of vias extends from one surface of the tube support portion to and opposite surface of the tube support portion. The ceramic element is coated with an electrically conductive coating and a current collector coating. The vias are coated with the electrically conductive coating and plugged. After the coatings are removed in selected areas of the ceramic element, the tubes of the ceramic element form a series-parallel array because tubes in the same column are connected in parallel electrically and tubes in adjacent rows are connected in series electrically. Two ceramic elements are sealed together to form an Integrated Manifold and Tube (IMAT) that creates a separate modular electrochemical device. The electrochemical device can be either an oxygen generator or a fuel cell. Manifolding together two or more modular oxygen generators can increase oxygen-generating capacity.

The present invention comprises a plurality of separate IMAT modules that are joined end to end forming a TriMAT module.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

Figure 1:
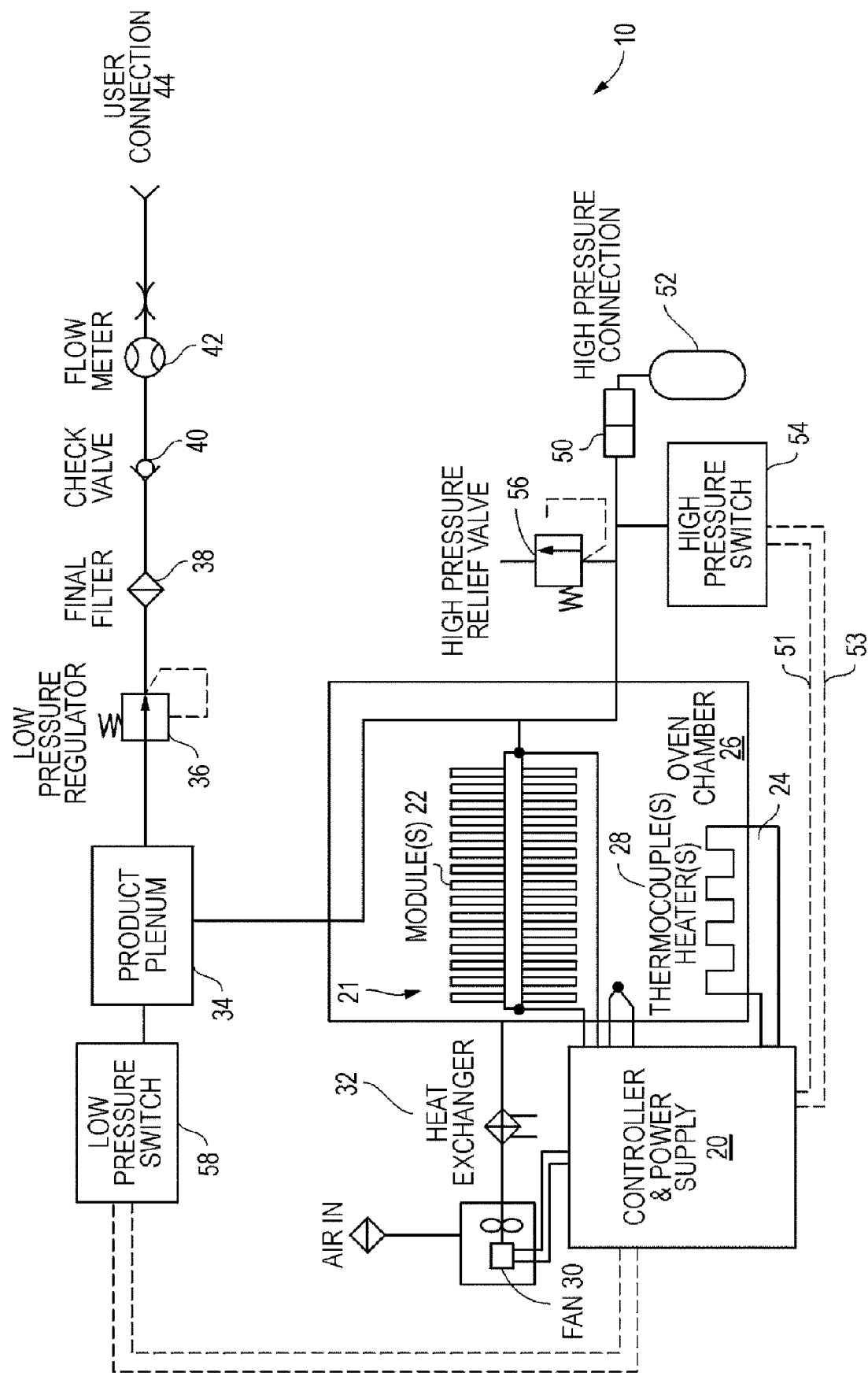
FIG. 1 depicts a schematic of a known complete oxygen generating system 10 utilizing an electrochemical oxygen generator in the form of a modular ceramic oxygen generator.

FIG. 1 illustrates a known schematic of a complete oxygen generating system 10 utilizing an electrochemical oxygen generator in the form of a modular ceramic oxygen generator. This schematic depicts a power supply and controller 20 that supplies electrical power to an oven heater 24 to raise the temperature within the operating range of an oxygen generating module assembly 22. The oxygen generating IMAT module 22 assembly can include one or more oxygen generating modules such as those disclosed in U.S. Pat. Nos. 5,871,624 and 5,985,113 and as will be describe below.

The temperature range in an oven chamber 26 may be about 500 to 800 degrees Celsius, depending on the materials used to construct the oxygen-generating module assembly 22. The oxygen generating modules 22 are positioned in the oven chamber 26. After the oven chamber 26 reaches the minimum preferred operating temperature, as detected by at least one thermocouple 28 mounted in the oven chamber 26, the controller 20 begins to apply electrical power to a fan motor 30 to deliver oxygen laden air through a counter flow heat exchanger 32 into the oven 26 chamber to a module assembly 21 including at least one module 22. The controller 20 also delivers electrical power to the modules 22, and oxygen is electrochemically generated, as taught in U.S. Pat. Nos. 5,871,624 and 5,985,113. Depending upon the amount of oxygen to be generated, the amount of electrical power can be varied. As electrical power is delivered to the modules 22 and oxygen is generated, electrical resistance within the modules 22 generates additional heat. To compensate for this additional heat, the controller 20 reduces power to the oven heater 24, to maintain the desired nominal operating temperature in the oven chamber 26. The oxygen being generated is delivered to a product plenum 34, which acts as a temporary oxygen storage vessel. The oxygen is delivered from the product plenum 34 to a low pressure regulator 36, final filter 38, check valve 40, flow meter 42, and lastly a user adjustable valve 44 for immediate use, for example, by a patient. The product oxygen would also be appropriate for other desired uses.

Oxygen may also be delivered to a high pressure connection that allows connection 50 of a removable portable oxygen storage cylinder 52. The portable cylinder 52 is filled automatically and can be used later. The controller 20 applies appropriate electrical power to the modules 22 to generate oxygen at elevated pressures until a high pressure switch 54 detects a pressure over about 1800 psig. Upon exceeding 1800 psig, the controller 20 reduces power to the modules 22 until pressure at the high pressure switch 54 falls below 1800 psig. The controller 20 also electrically monitors the low pressure switch 58. This switch 54 enables regulation of the pressure delivered to the product plenum 34 and high pressure connector 50 to a nominal pressure of about 1800 psig. A high pressure relief valve 56 vents excess pressure above about 2000 psig, in the event of a malfunction of the controller 20 to limit the nominal pressure to less than 2000 psig, and to relieve excessive temperature related pressure increases. It should be understood that the maximum normal operating pressure is approximately 1800 psig. The controller 20 also electrically monitors the high pressure switch 54. If the operating pressure is below the minimum operating pressure after a given period of time, then the controller 20 activates a warning light and audible alarm (not shown).

Figure 2:
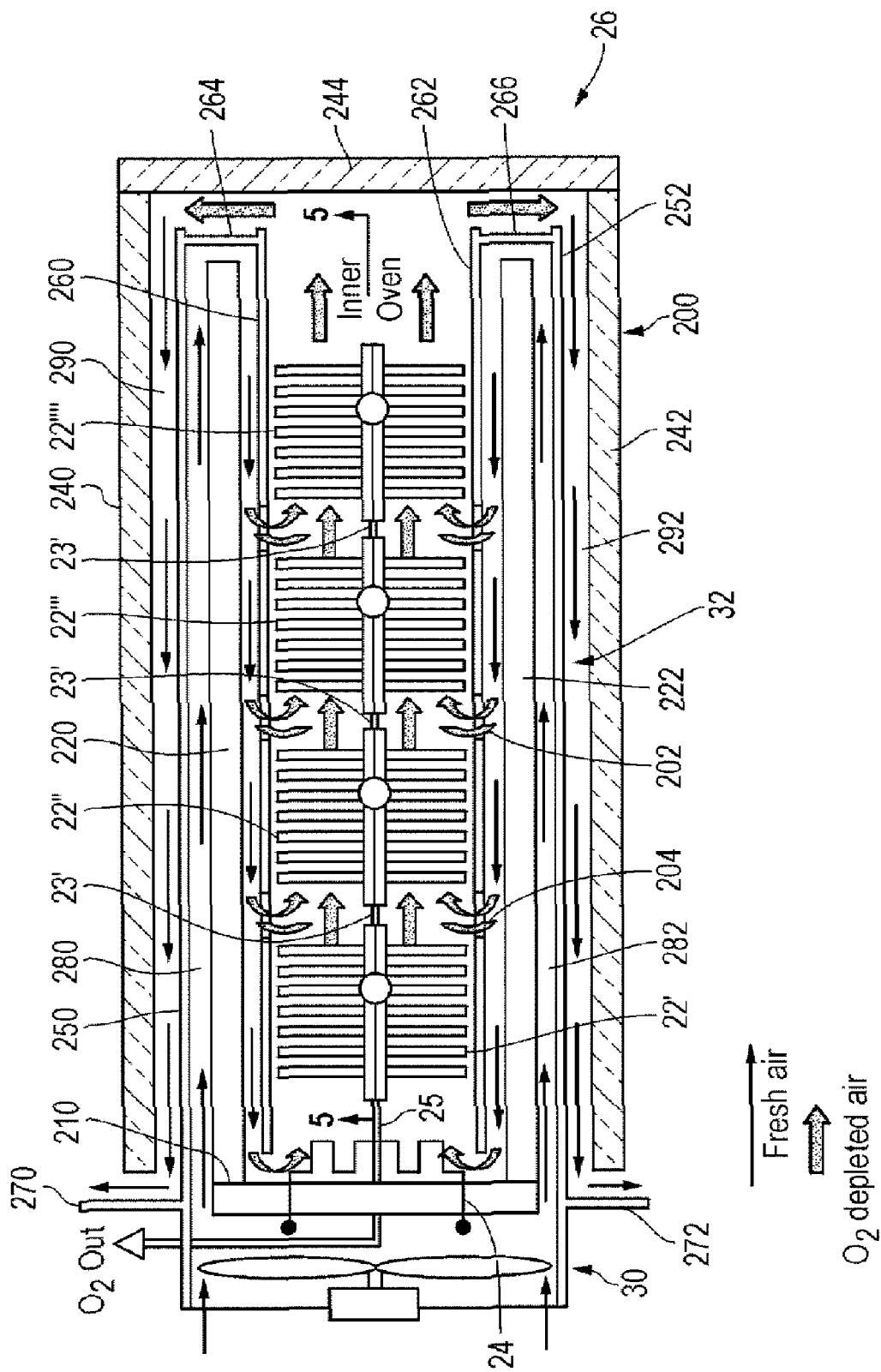
FIG. 2 is a schematic diagram depicting a cross section of the known ceramic oxygen generating system depicting the oven, insulation, modules, heaters, planar counter flow heat exchanges, air flow dampers and fan.

FIG. 2 illustrates a cross section of the known ceramic oxygen generating system depicting the oven 26, insulation 200, oxygen generating module assemblies 22, heaters 24, planar counter flow heat exchangers 32, air flow dampers 202, and fan 30. The counter flow heat exchanger is a very effective, simple, low cost design approach. As depicted in FIG. 2, four oxygen generating modules 22', 22", 22''', 22'''' from the oxygen generating assembly 21 although any number of modules can be used. The oxygen generating modules 22', 22", 22''', 22'''' are manifolded together by tubes 23', 23", 23'''. An outlet or delivery tube 25 passes through the wall 210 to provide high-pressure oxygen to the product plenum 34 and the high-pressure connection 50.

Cool fresh air is heated before the air enters the inner oven, and the hot air is cooled before it exits the oven 26; thereby, conserving energy. In a planar counter flow configuration illustrated in FIG. 2, the fan 30 introduces cool, oxygen laden air into the channels 280, 282 between the outer surface of the inner walls 220, 222 made of oven insulation 200 and the inner surfaces 250, 252 of the heat exchanger wall. This cool air is heated as it passes inward along the heat exchanger wall, because hot oxygen depleted air is exiting outward from the inner oven 26 on the other side of the heat exchanger wall. The incoming air is also partially heated by an outer surface of the walls 220, 222 of oven insulation 200, followed by an inner surface of the walls 220, 222 of the oven insulation 200, after a 180° turn mid way into the inner oven. Channels 280, 282 each flow from the fan 30 from left to right and then reverse and flow from right to left.

Electrical resistance is inherent to electrochemical oxygen generating systems that utilize electrical potential energy rather than chemical potential energy as a driving force. The electrochemical oxygen generating modules 22 generate heat as well as oxygen. Too much oven insulation 200 and very efficient heat exchangers could result in runaway oven temperatures. One method of temperature control is to ensure that some amount of heater activation is always used to maintain the normal operating temperature, after the initial startup period of time. Another method is to adjust the fan 30 speed to cause additional air to be circulated through the oven 26 carrying away the excess heat. The controller 20 monitors the temperature in the inner oven 26 using one or more strategically placed thermocouples 28 (not shown in FIG. 2) to ensure that the oven temperatures are normal. The controller 20 uses this information to adjust either the heater 24 voltage or fan 30 speed to control the temperature of the inner oven 26.

As depicted in FIG. 2, six air dampers 202 may be used in the embodiment depicted. Three dampers are each mounted to walls 260, 262 with the dampers 202 being positioned between modules 22 and opposite each other. The air dampers 202 shown allow some oxygen laden air to enter the module chamber or inner oven 26 before completing the entire heat exchanger flow path to the inner oven. If all oxygen laden air were forced to traverse the entire heat exchanger flow path, a higher temperature gradient would occur across the series of modules 22 in the oven. The air would be progressively heated as it passes over each module 22. Allowing some air to enter near the latter modules 22''', 22'''' provides a more uniform temperature across the modules 22' 22'''' and prevents modules 22''', 22'''' from possibly over heating. These dampers 202 are adjustable and can be manually adjusted during the assembly of the system 10 and during an initial start up test process after completion of the manufacturing and assembly process of the system 10. These dampers 202 include damper flaps 204 which are mounted to a suitable cylindrical rod (not shown) that extends through the inner oven insulation and support structure to outside the inner oven 26. The external ends of the damper rods can be rotated and secured in the preferred orientation during the assembly process. Alternately, the dampers could be adjusted automatically by the controller 20, based upon the inner oven 26 temperatures measured by the thermocouples 28. Several types of electromechanical damper actuators are available that could be used.

Figure 3:
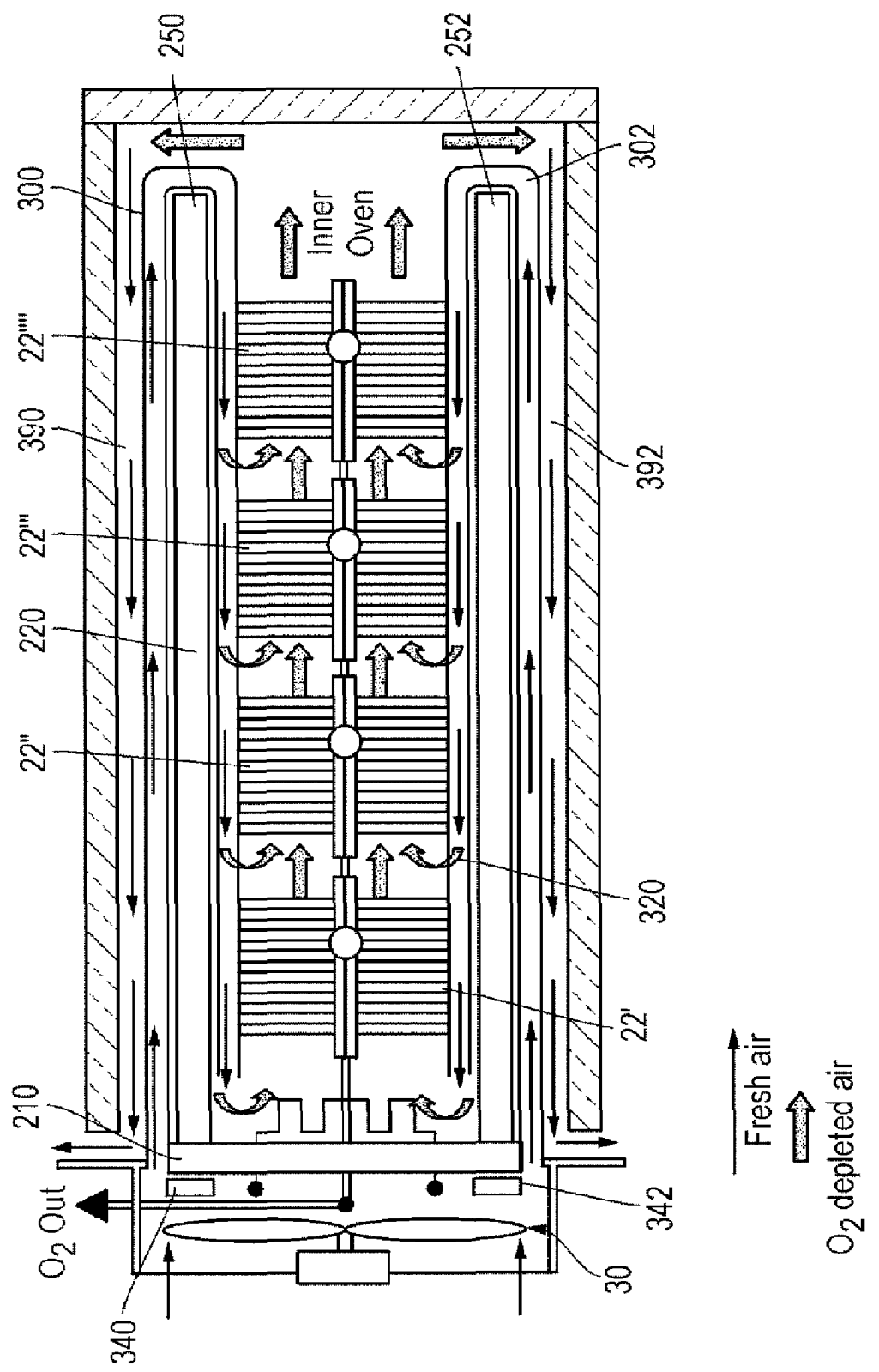
FIG. 3 is another schematic diagram similar to FIG. 2, depicting a second known heat exchanger embodiment.

FIG. 3 depicts another type of known heat exchanger embodiment. This is another approach comparable to the planar heat exchanger with flow control dampers described above with respect to FIG. 2. A tubular heat exchanger approach utilizes multiple cylindrical tubes 300, 302 that enter the oven between the inner and outer insulation, traverse to the far end of the oven, enter the inner oven 26, and returns to the opposite end of the oven on the inside of the inner insulation. The cool oxygen laden air is forced into the tubes 300, 302 by the fan 30 and delivered to the inner oven 26 at the same end of the oven. The hot oxygen depleted air flows in the opposite direction around the outside of the tubes 300, 302 to cool the oxygen depleted air and warm the cool oxygen laden air. Some of the tubes have holes 320 at strategic points (typically between modules 22', 22''; 22'', 22'''; and 22''', 22'''') along the return path in the inner oven, or some of the tubes end at strategic points along the return path in the inner oven 26. This allows some air to enter the chamber prior to traversing the complete length of the tubes 300, 302; thereby, allowing a more even temperature gradient as described above for the planar heat exchanger with air flow control dampers.

As depicted in FIG. 3, dampers 340, 342 are located where the cool oxygen laden air enters the tubes 300, 302 near the fan 30. Some of the tubes that do not have holes or do not end before traversing the complete pathway into the inner oven 26 at the fan end also do not have dampers. The remaining tubes, that do have holes or do end before traversing the complete pathway into the inner oven at the fan end, also do have dampers. The dampers are located at the open end of the appropriate tubes on the fan side of a tube plate that secures the tubes in place. The dampers can be positioned across the open ends of the tubes to occlude them, as required to regulate the temperature of each zone within the inner oven. The dampers 340, 342 can be manually adjusted or automatically adjusted by the controller 20 as described earlier.

Another method for controlling the temperature of the ceramic generator or the rate of oxygen production is to reduce the quantity of feed air supplied to the generator, or to reduce the quantity of oxygen in the feed air. As previously explained, there is an equivalence between the rate of oxygen production and the current flow through the ceramic generator. The electrical current flow is proportional to the voltage applied to the generator minus the Nernst Einstein voltage.

The Nernst Einstein voltage is proportional to the difference in the oxygen partial pressures at the input and output of the ceramic generator. Therefore, as the input oxygen partial pressure decreases or as the output oxygen partial pressure increases, or both, the current flow and thus the oxygen flow is decreased. In practice the input oxygen partial pressure can be reduced by use of the dampers previously described as well as other means such as reducing fan 30 speed. As the oxygen flow and the current flow through the ceramic generator are reduced, the power dissipation in the generator is reduced thereby reducing the self heating within the module resulting in a lower generator temperature.

Figure 4B:
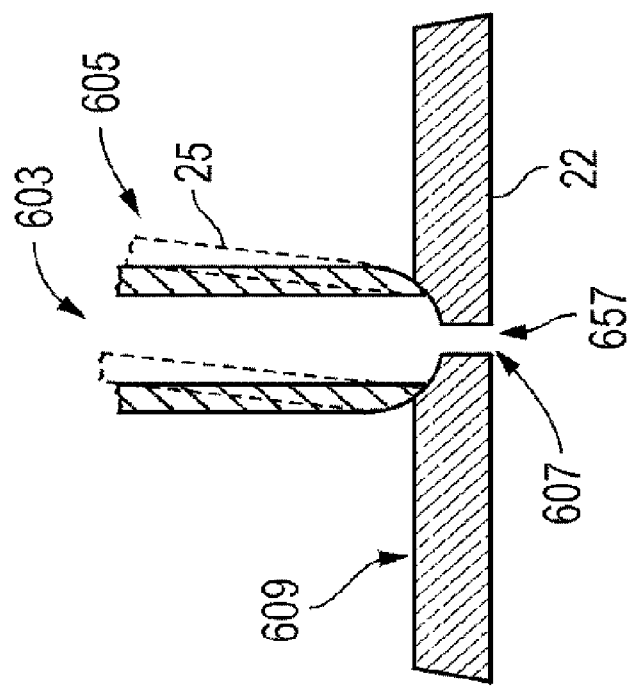
FIGS. 4A and 4B depict a prior art pneumatic interface using a concave depression.
Figure 4A:
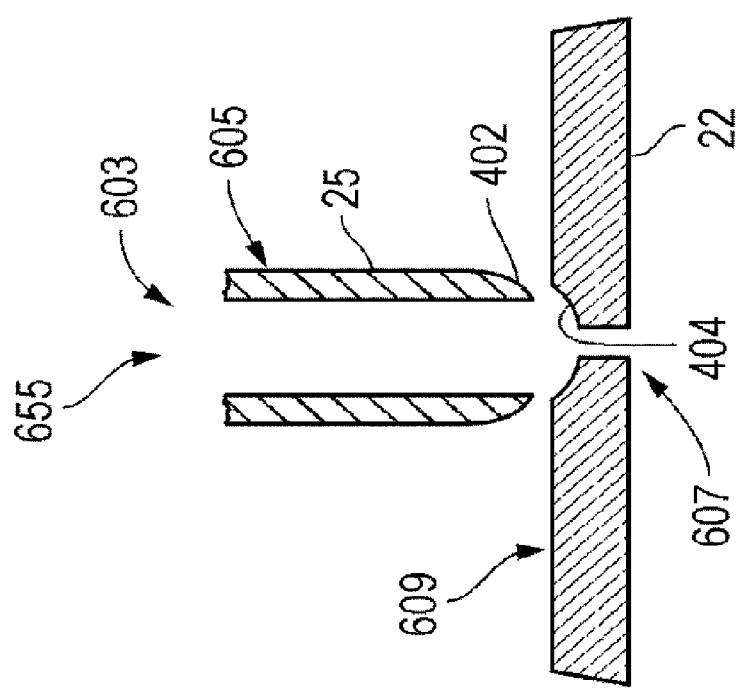
Figure 5:
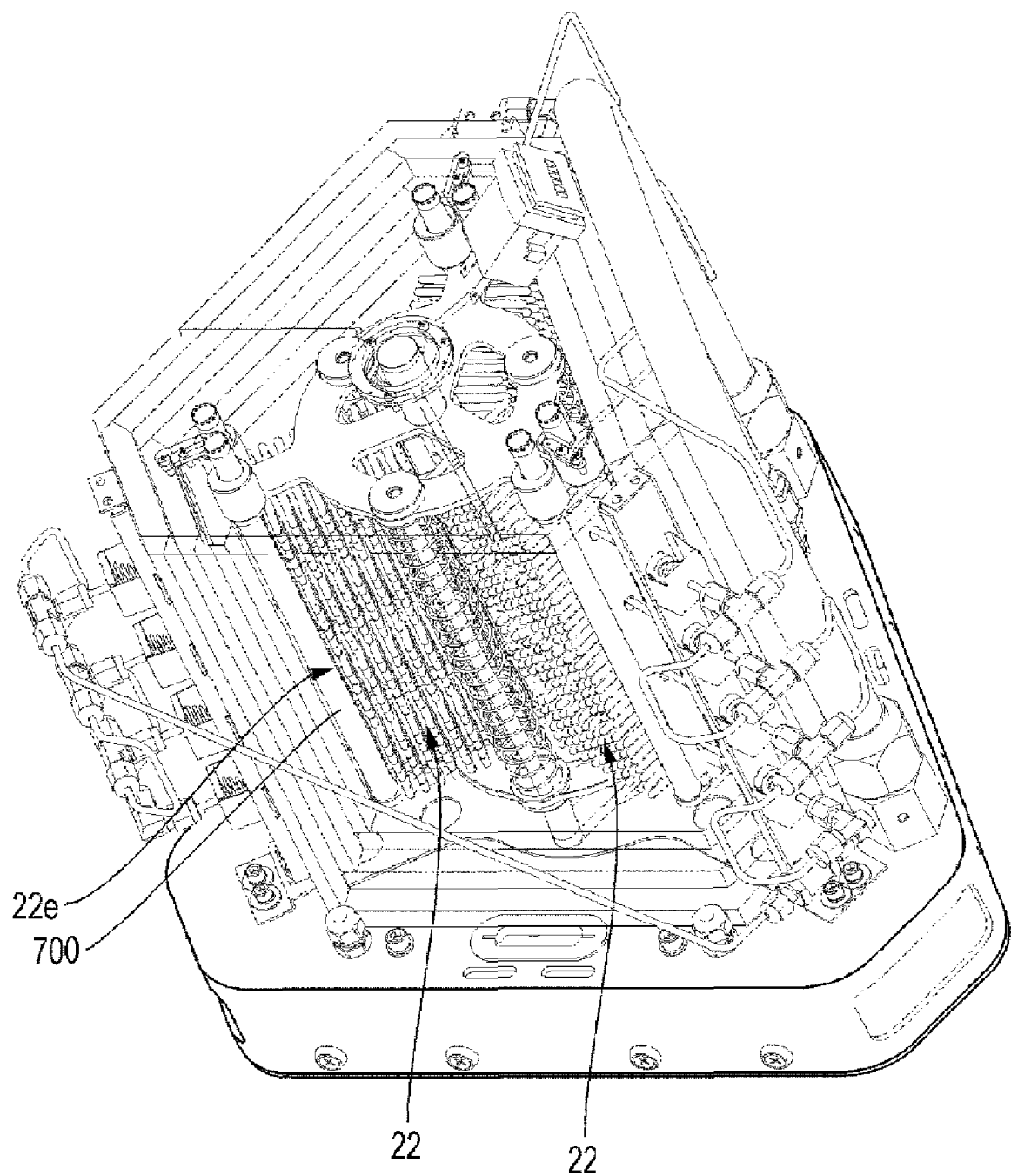
FIG. 5 is a perspective view of a prior art oxygen generator showing a plurality of IMAT modules being operably mounted.
Figure 6:
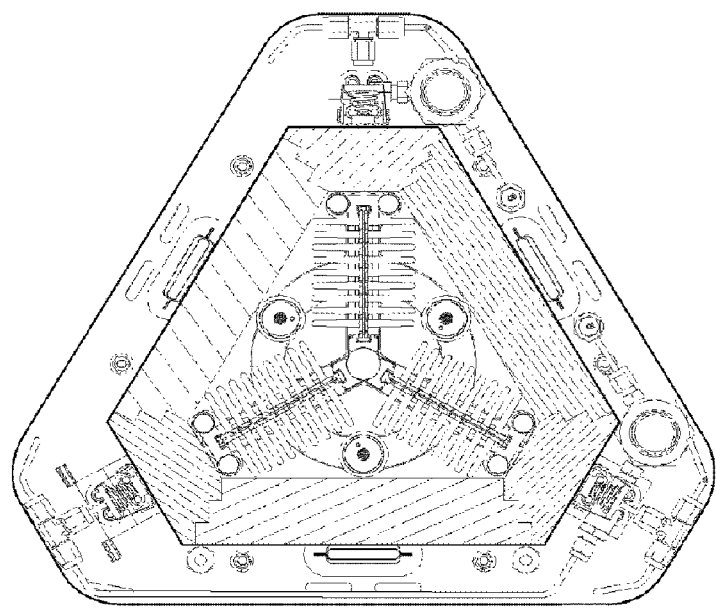
FIG. 6 is a top view of the known oxygen generator of FIG. 5.
Figure 7:
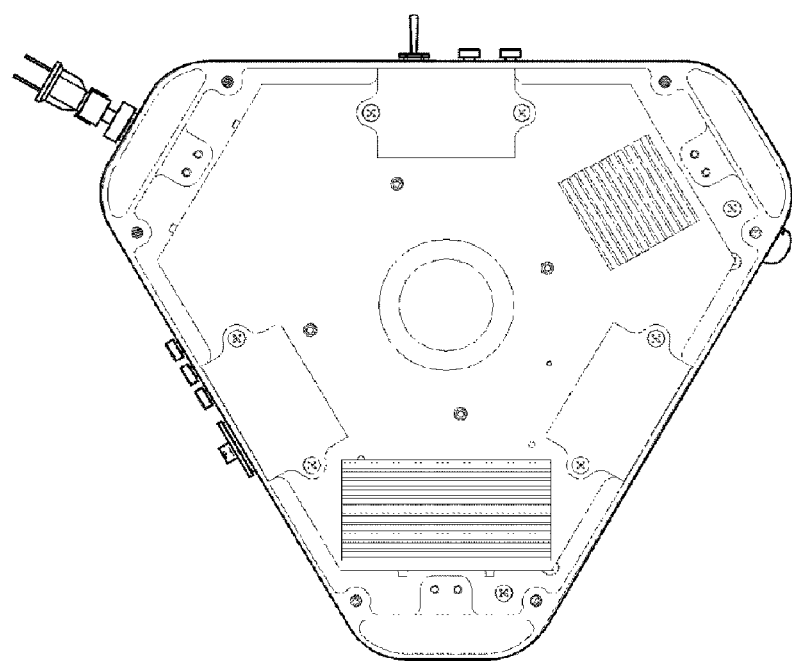
FIG. 7 is a top view of the bottom support member of the known oxygen generator of FIG. 5.
Figure 8:
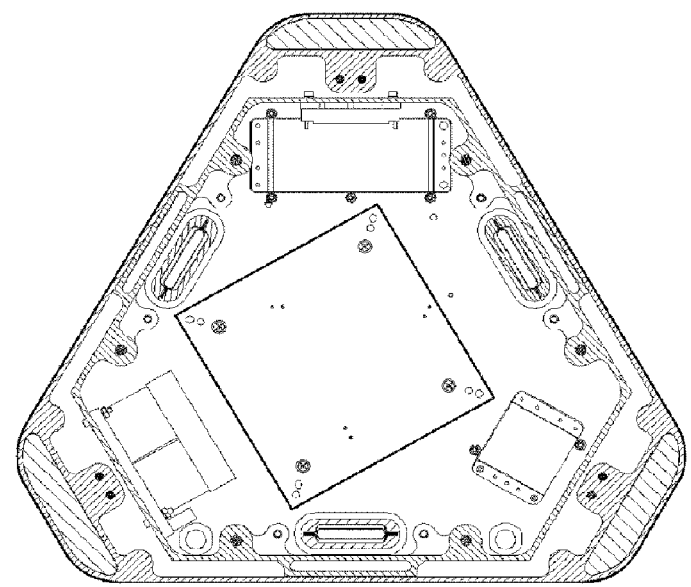
FIG. 8 is a bottom view of the known oxygen generator of FIG. 5.

In all of the described known embodiments, the oxygen delivery tubes 23', 23'', 23''' and 25 of the individual modules 22 must either extend outside the heated section of the furnace or be internally joined and the resulting tube 25 extended outside the furnace. One method of extending individual tubes outside the furnace or inner oven 26 is to use a ceramic tube 25 sealed into a matched hole or indentation in the module 22'. The use of a ceramic tube minimizes stresses on the tube to module interface caused by differing coefficients of thermal expansion. However, this method presents a problem in that the tube, module, and seal are all composed of brittle materials that cannot sustain any significant displacement without breaking. It is difficult to prevent the application of bending moments on the tubes using this approach. The preferred prior method was to form a more resilient seal by forcing a spherically shaped device or mating end 402 of the tube 25 into a matching or compatible concave surface or indentation 404 formed about the passageway 607 in the module 22 or housing 609. The convex spherical shape can be formed on the outer surface of the tube 25 and the concave surface in the module wall or vice versa. Also, the concave depression could be conical in form as well as spherical. This prior method allowed a seal that will accommodate a significant amount of misalignment if the tube 25 is continuously pressed into the concave surface 404 as, for instance, by the action of a spring or weight. FIG. 4 illustrates this prior method and shows a significant misalignment accommodated while still maintaining a viable seal.

FIGS. 5 through 8 demonstrate another known embodiment of the prior electrochemical oxygen generating system with a plurality of separate IMAT modules 22 having their individual module ends 22e feeding into a collection manifold 700 or collection tube system.

IMAT Modules

The described embodiments of the ceramic IMAT modular element 800 are preferably injection molded in one-piece of an ionically conductive ceramic electrolyte. The ceramic modular element 800 can also be machined, either in one-piece from a solid block of the same or similar ceramic material, or from several members and then bonded together to form the modular ceramic element.

Whether injection molded or machined, advantageously, the entire element is manufactured from a single material to eliminate problems associated with using different materials having different coefficients of expansion. A single material having a uniform coefficient of thermal expansion provides for leak free operation as described in detail below.

Advantageously, the modular ceramic element 800 provides a large surface area per unit volume. As discussed in detail below, the ceramic modular element 800 is preferably usable in pairs to form either an oxygen generating assembly or a fuel cell assembly. The symmetry of the modular construction of the ceramic element 800 allows a second element to be inverted and sealed to the first element to form either the oxygen generator or fuel cell assembly. The second element is preferably identical to the first element 800.

The ceramic modular element 800 includes an array of spaced apart elongated tubes 802 extending from a generally planar tube support member 804.

Figure 9:
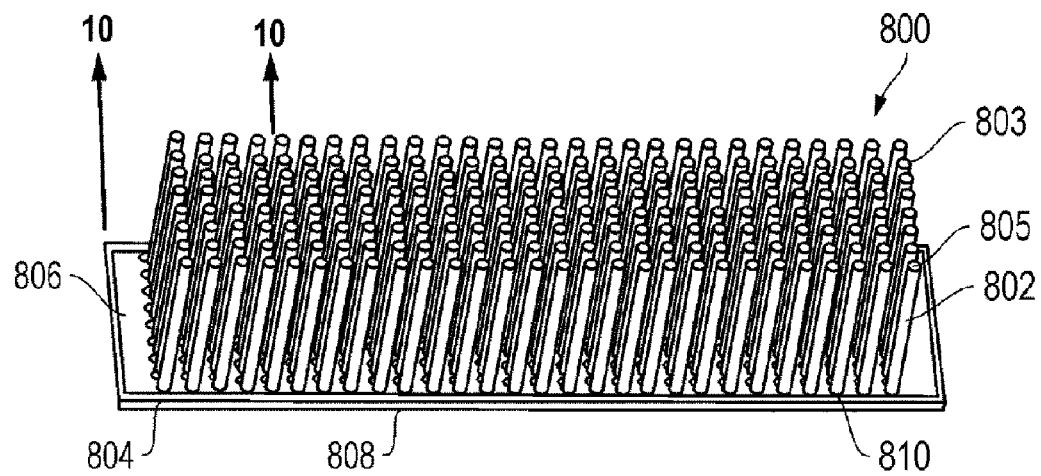
FIG. 9 is a top perspective view of a modular ceramic element used in an electrochemical IMAT module.

The support member 804 is of a generally rectangular configuration. It is to be understood that while circular or cylindrical tubes 802 having exterior and interior surfaces are depicted in the described embodiments, other configurations for the "tubes" could be used and the term "tube" is used herein only for purposes of convenience of reference. The array, as depicted in FIG. 9, has eight rows and twenty-eight columns, for a total of two hundred and twenty-four tubes although the invention is not limited to the number of tubes illustrated. The number, size and length of the tubes 802 depends, for an oxygen generator, on the amount of oxygen desired to be produced. A distal outer end of each tube 802 is closed at an end 805.

As depicted in FIG. 9, the ceramic modular element 800 in the first embodiment has a flange portion 810 around the perimeter thereof which extends downwardly from a lower surface 808 of the ceramic modular element 800.

Figure 10:
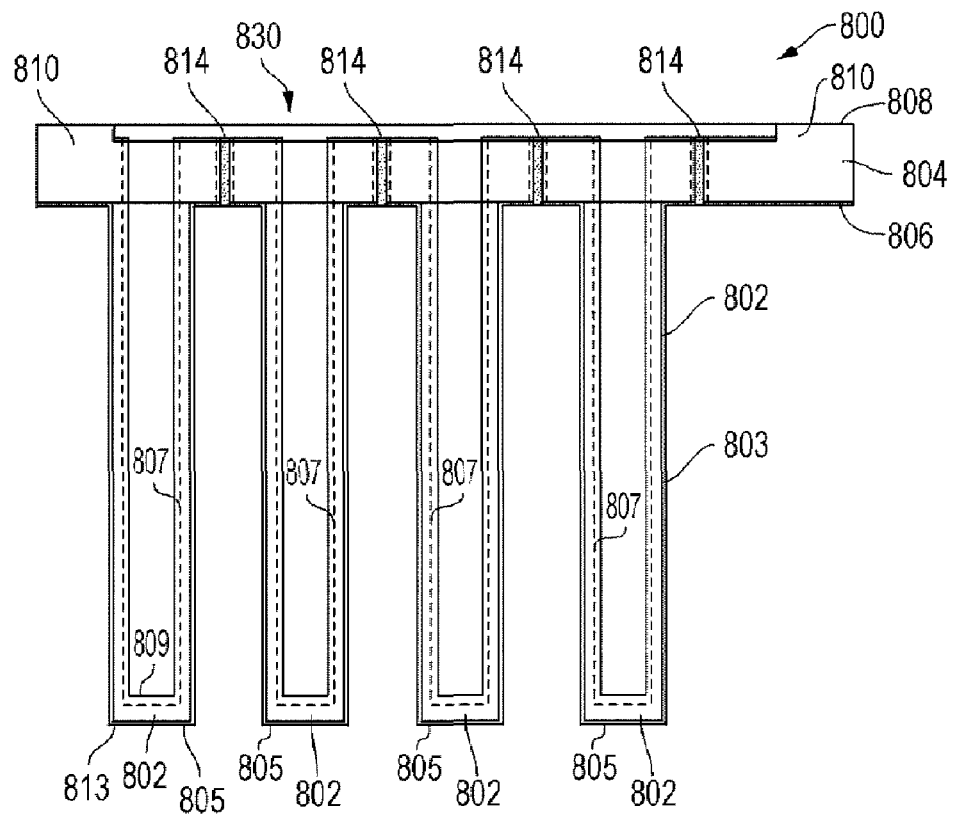
FIG. 10 is a side elevational cross sectional view of the ceramic element of FIG. 9 taken along line 10-10 in FIG. 9.

For use as an oxygen generator, a major portion of an exterior surface of the ceramic modular element 800 is coated, during a coating process, with a catalyzing and electrically conductive material, as depicted in FIG. 10. Additionally, and preferably, the ceramic modular element 800 is then coated with a current collecting coating. The exterior surface of element 800 includes an upper surface 806 and outer surfaces 803 of the tubes 802 along with the closed ends 805 thereof. Likewise, the lower surface 808 and interior surface 807 of each of the tubes 802 are coated with a similar electrically conductive material and then preferably a current collecting coating. The closed ends 805 of tubes 802 have a flat interior surface 809 and a flat exterior surface 813 as depicted in FIG. 10 although in either of the described embodiments the surfaces 809 and 813 can be either flat or curved or a combination thereof. The interior surfaces 807 of the tubes 802 are open to the atmosphere as depicted in FIG. 9.

For use in a fuel cell, in all described embodiments, the modular ceramic element is coated with only a metal ceramic composite coating on the surfaces exposed to fuel. The surface exposed to air or oxygen would be coated with the same coatings as used on the oxygen generator as described herein. The metal ceramic composite is electrically conductive but differs in composition from the coating used for the oxygen generator because of the oxidizing environment to which the fuel cell is exposed during operation. The coating is 30-70% vol. Ni and 30-70 vol. stabilized zirconia with 40% vol. Ni and 60% vol stabilized zirconia being preferred. The electrical interconnections described herein are the same whether the ceramic element 800 is used in an oxygen generator assembly or a fuel cell assembly. Preferably, the wall thicknesses used in a fuel cell would be less than that for a similarly sized oxygen generator to improve the electrical efficiency.

A series of vias 814 extend from upper surface 806 through to the lower surface 808. The vias 814 are holes which extend through the ceramic electrolyte. Each via 814 is located adjacent to a corresponding tube 802 and offset therefrom in both length and width directions. The number of vias 814 corresponds to the number of tubes 802 and the vias 814 are similarly positioned in columns and rows. The vias 814 are plated through (and filled or plugged) with the electrically conductive coating during the coating process.

Figure 11:
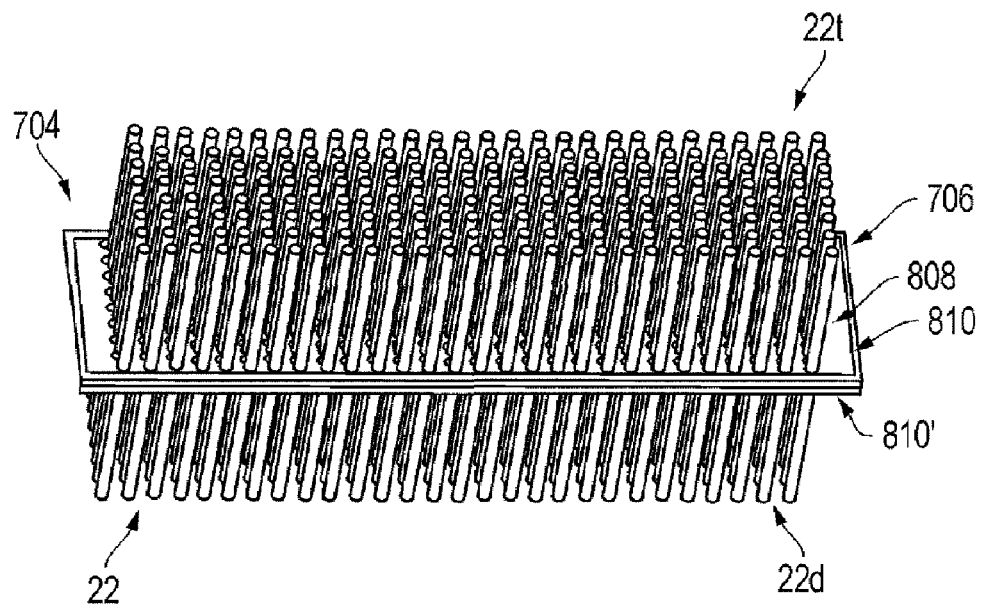
FIG. 11 is a top perspective view of a known IMAT module.

An IMAT module assembly 22 is depicted in FIG. 11. The elements 22t and 22d forming the FIG. 11 module assembly 22 are preferably identical and symmetrical to form complete IMAT module assembly 22. The flange members 810, extend outwardly from the lower surface 808 of tube support member 804 around the perimeter thereof so that when the elements 22t and 22d are placed together, the flange members 810 and 810' are joined to form an interior sealed space or manifold 830 in the interior thereof between the lower surfaces 808 of the two elements 22t and 22d. In either of the described embodiments, a cover plate (not shown) can be used in place of ceramic element 22d.

TriMAT of the Present Invention

Figure 12:
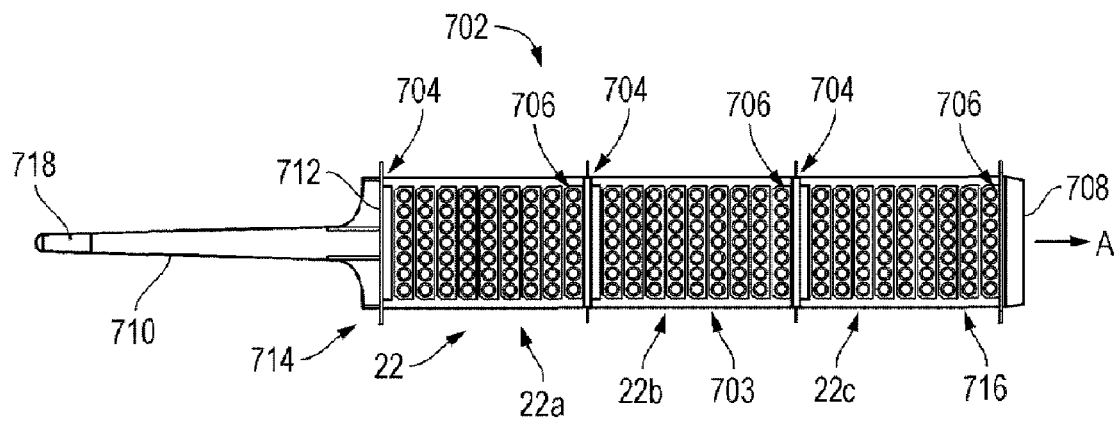
FIG. 12 is a top view of a TriMAT module of the present invention.
Figure 13:
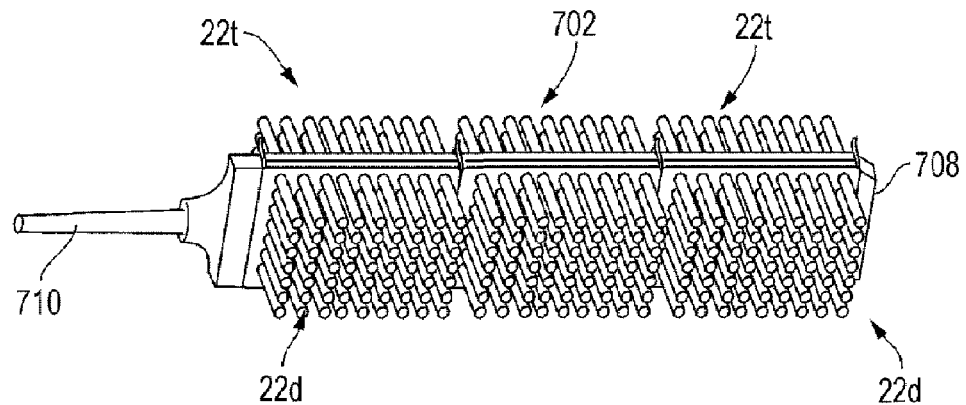
FIG. 13 is another perspective view of the TriMAT module of the present invention.

Referring particularly to FIG. 12, the present invention defines a way of assembling a plurality of separate modules or units (IMATs) 22 to form a TriMAT 702. By way of example, three IMATs 22a, 22b, 22c may be sealed end-to-end thereby reducing the electrical and mechanical connections by two thirds. Such a TriMAT 702 assembly also preferably includes a product delivery tube serving as a path for the oxygen to exit the oven. There may be a parking block on the opposite end of the TriMAT 702 that serves as a mechanical mount, and is used to electrically isolate the TriMAT 702 from the rest of the system. The present invention solves the problem of finding a way to assemble modules in a practical and economical manner.

IMAT modules or units 700 are bonded together into a central unit 703 along a central axis A end to complementary end, or a second end 706 to a first end 704 of another IMAT module, thereby eliminating the intermediate components and associated failure modes. The central portion 703 has a first end 714 and an opposite second end 716.

A support block 708 of material may optionally be bonded over the outlet hole at a bottom side 706 of the second end 716 of the IMAT central portion 703 forming the TriMAT unit 702. The optional support block 708 blocks one end 706 of the IMAT module 22c situated at the end 716 of the central portion 703, and provides a "foot" for mounting the TriMAT unit 702.

A "T" shaped ceramic collection tube 710 with a flange 712 at one end forming the T may be attached to the end 714 of the central portion of the TriMAT unit 702 that is opposite the TriMAT end 716 mounting the support block 708. The collection tube 710 is attached by the same means as the separate IMAT units 22 are attached to one another. This creates one monolithic structure of the present invention that is highly resistant to vibration, and with much less likelihood of leakage. The present TriMAT 702 may simply be held in place at the ends, thereby eliminating most of the mounting structure previously used.

Figure 14:
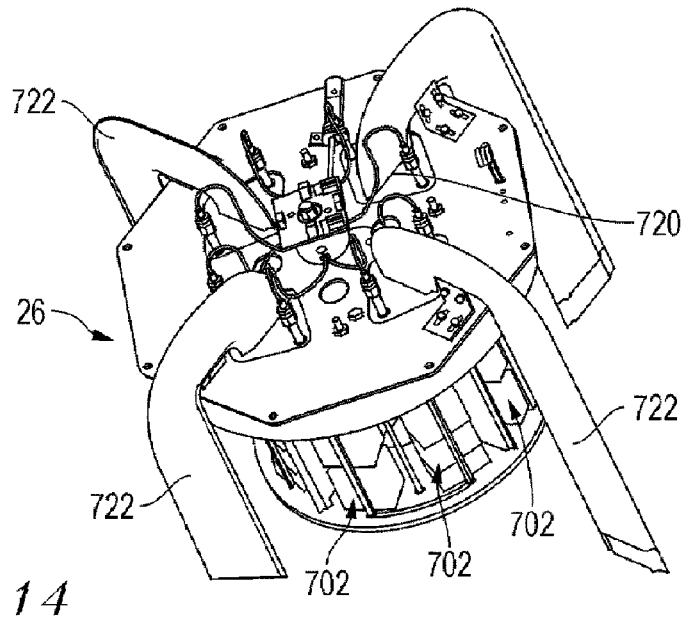
FIG. 14 is a top perspective view of the oven mounting a plurality of TriMAT modules.

A product output or delivery tube 718 extends outside the oven chamber 26, where an adapter 720 is used to make the connection to a metal collection tube 722 as is shown in FIG. 14.

Multiple known IMAT modules 22 may be sealed together using the same fired glass materials and process that is used to assemble the module halves 22d, 22t to form the individual modules 22 as is shown in FIG. 12. Putting two opposing forms 22d, 22t together was done to create a manifold from where the gas going through the membrane could be collected. The operational requirements for the present TriMAT device 702 are that: 1) IMATs are connected to each other and the outside of the oven electrically; 2) the modules require mounting/fixturing in some manner; and 3) the separate IMAT modules or units must be connected pneumatically for collection of the gas being generated in each module.

The two individual ceramic parts making up each IMAT module are generally wired in parallel, and the IMAT modules making up a TRIMAT of the present invention are generally electrically connected in series. For example, each pair of TRIMATs units is wired in series, simply to optimize the current and voltage requirements. That electrical connection could be different in other instances depending on the engineering choice. Thus, the general method of electrical connection has not changed schematically from earlier known designs, however with the TriMAT module 702 of the present invention, the wiring requirements are reduced and simplified.

Three IMAT units 22a, 22b, 22c being joined is shown in this specific embodiment for compatibility with a specific application in terms of the number of modules chosen, the available space, and other determined or selected conditions. Other specific applications or embodiments may use a different number of IMAT modules 22 or TriMAT modules 702 attached in a similar or compatible method.

The primary design requirements for the internal oven assembly are as follows:
(1) Provide a mounting mechanism and support assembly to support the modules within the oven.
(2) Connect the individual modules to one another electrically, and to the wiring outside the oven.
(3) Connect the modules pneumatically to transport the collected oxygen out of the system.
(4) Efficient use of real estate to maximize the number of IMATS contained within a specific size of oven.

Factors determining the suitability of various options:
(1) Cost, both due to the number and cost of purchased or manufactured components, and the labor required to assemble and test the oven.
(2) Structural integrity through expected vibration or shock.
(3) Ability to withstand the thermal expansion of various components during temperature excursions between room temperature and around 700 degrees Celsius, without creating extra stress on components or leaks.
(4) Air tight sealing of the oven assembly to prevent leakage of the dangerously hot air from inside the oven.

The prior known methods involved physically mounting each individual IMAT module 22 on a rack or supporting structure within the oven, using individual wires or conductive clips to connect modules electrically, while insulating the single IMAT modules 22 from the metal support assembly, and a system of tubing and fittings to collect the gas. Each single IMAT module 22 had a spherical female bearing surface machined around the oxygen output hole. A metal or ceramic tube with a matching spherical tip was held against each module with spring pressure to allow the movement caused by thermal expansion during operation. While this system solved breakage problems experienced with earlier approaches, the cost of the components and the labor required to assemble the complex supporting structure and output or outlet tubes is undesirable. Creating and maintaining reliable seals between the spherical surfaces also are difficult.

The present TRIMAT 702 invention solves the sealing and leakage problem by reducing the number of connections through the oven walls from one per IMAT module 22 to one per TRIMAT module 702, and by moving the outlet from the sides of the oven to the top, allowance can be made for thermal expansion without a flexible joint.

By sealing the ends of the modules together with a highly reliable glass seal, the gas flow is now from module to module, then out of the oven through a single port for each TRIMAT module of the present invention. Adding the ceramic outlet or output tube designed to provide the necessary strength to prevent breakage during vibration moved the metal/ceramic joint outside the oven where the temperature is more manageable.

The efficient arrangement achieved by the present invention through eliminating hardware used in the prior methods allows for approximately twice as many modules in the same oven size. The electrical connection between modules may be made by simply twisting lead wires together that are attached to each module during fabrication. The overall assembly resulting from the incorporation of the present TRIMAT contains a small fraction of the parts that were used in prior known methods, while improving the integrity of the gas path, improving the air seal between the inside of the oven and the surrounding area, and greatly simplifying assembly and test process.

The foregoing disclosure and description of the invention are illustrative and explanatory thereof, and various changes in the size, shape and materials, as well as in the details of the illustrated construction may be made without departing from the spirit of the invention.

What is claimed is:

1. An ionically conductive ceramic element comprising:
   a central unit having a first end and a second end; the central unit composed of a plurality of integrated manifold and tube (IMAT) modules being joined end to end along a central axis;
   each IMAT module having at least one tube support portion on having first and second surfaces and a plurality of tube portions extending from said first surface, said tube portions each having a closed end and an open end, said second surface being at least partially open to the atmosphere, said open ends of said plurality of tube portions being open to the atmosphere through said second surface; and,
   an interior space formed in the interior of the IMAT module for collecting a desired product gas; and,
   a "T" shaped product output tube being operably joined and forming a monolithic structure with the first end of the central unit for transporting the desired product gas collected in the interior space of the connected IMAT modules and resisting vibration.

2. The invention of claim 1 further including a support block mounted with the second end of the central unit.

3. The invention of claim 1 wherein the ceramic element is coated with a metal ceramic composite surface coating.

4. The invention of claim 1 wherein the ceramic element is composed of an ionically conductive ceramic electrolyte.

5. The Invention of claim 1 wherein ends of the IMAT modules are sealed together with a glass seal.

6. The invention of claim 1 wherein the product output tube is composed of a ceramic material.

7. An improved electrochemical oxygen generating system of the type including a power supply and controller supplying electrical power to an oven heater raising a temperature within an operating range of an oxygen generating module assembly having an oven unit and at least one ionically conductive ceramic element, the improvement comprising:
   the ionically conductive ceramic element including a central unit having a first end and a second end; the central unit composed of a plurality of integrated manifold and tube (IMAT) modules being joined end to end along a central axis;
   each IMAT module having at least one tube support portion having first and second surfaces and a plurality of tube portions extending from said first surface, said tube portions each having a closed end and an open end, said second surface being at least partially open to the atmosphere, said open ends of said plurality of tube portions being open to the atmosphere through said second surface; and, an interior space formed in the interior of the IMAT module for collecting a desired product gas; and, a "T" shaped product output tube being operably joined and forming a monolithic structure with the first end of the central unit for transporting the desired product gas collected in the interior space of the connected IMAT modules and resisting vibration.

8. The invention of claim 7 further including a support block mounted with the second end of the central unit.

9. The invention of claim 7 wherein the ceramic element is coated with a metal ceramic composite surface coating.

10. The invention of claim 7 wherein ends of the IMAT modules are sealed together with a glass seal.

11. The invention of claim 7 wherein the product output tube is composed of a ceramic material.

* * * * *